(12) United States Patent
Bryan (10) Patent No.: US 9,332,068 B2
(45) Date of Patent: May 3, 2016

(54) MECHANISMS FOR TRANSPARENTLY CONVERTING CLIENT-SERVER SOFTWARE AGENTS TO PEER-TO-PEER SOFTWARE AGENTS

(75) Inventor: David A. Bryan, Williamsburg, VA (US)

(73) Assignee: Ooma, Inc., Palo Alto, CA (US)

( * ) Notice: Subject to any disclaimer, the term of this patent is extended or adjusted under 35 U.S.C. 154(b) by 829 days.

(21) Appl. No.: 12/932,859

(22) Filed: Mar. 8, 2011

(65) Prior Publication Data

US 2011/0167165 A1    Jul. 7, 2011

Related U.S. Application Data (63) Continuation-in-part of application No. 12/313,609, filed on Nov. 21, 2008, now abandoned.

(60) Provisional application No. 61/004,900, filed on Nov. 29, 2007.

(51) Int. Cl.
  G06F 15/16    (2006.01)
  H04L 29/08    (2006.01)
  G06F 9/54     (2006.01)

(52) U.S. Cl.
  CPC .............. *H04L 67/104* (2013.01); *G06F 9/541* (2013.01); *H04L 67/1091* (2013.01)

(58) Field of Classification Search
  CPC ..... H04W 92/02; G06F 9/54; H04L 67/1091; H04L 67/104
  USPC ........................................................ 709/230
  See application file for complete search history.

(56) References Cited

U.S. PATENT DOCUMENTS

| | | |
|---|---|---|
| 5,548,726 A | 8/1996 | Pettus |
| 6,490,291 B1 | 12/2002 | Lee |
| 2003/0217158 A1* | 11/2003 | Datta ........................ G06F 9/54 709/228 |
| 2006/0239275 A1 | 10/2006 | Zlateff |
| 2006/0239297 A1 | 10/2006 | Rao |
| 2006/0253595 A1* | 11/2006 | Datta ............................ 709/228 |
| 2007/0076729 A1 | 4/2007 | Takeda |
| 2007/0263616 A1 | 11/2007 | Castro |
| 2007/0276931 A1 | 11/2007 | Mahdavi |
| 2008/0098121 A1* | 4/2008 | Wu ................................ 709/229 |
| 2008/0240037 A1* | 10/2008 | Bedekar et al. ............... 370/331 |
| 2008/0313265 A1* | 12/2008 | Pounds .............. G06Q 30/0251 709/202 |
| 2009/0316687 A1* | 12/2009 | Kruppa ......................... 370/352 |

OTHER PUBLICATIONS

Lui, S. et al., "Interoperability of Peer-to-Peer File Sharing Protocols," ACM SIGecom Exchanges, vol. 3, No. 3, Aug. 2002, pp. 25-33.

* cited by examiner

*Primary Examiner* — Richard G Keehn
*Assistant Examiner* — Mohammed Ahmed
(74) *Attorney, Agent, or Firm* — Lumen Patent Firm (57) ABSTRACT

A method of converting client-server software agents to peer-to-peer software agents coupling a client to an adaptor software module is provided. The method includes directly coupling a client in software to an adaptor software module, wherein said adaptor software services underlying traffic from an unmodified agent and relays it on behalf of said unmodified agent, wherein all traffic generated by said unmodified agent is relayed directly to said adaptor software module.

6 Claims, 6 Drawing Sheets

MECHANISMS FOR TRANSPARENTLY CONVERTING CLIENT-SERVER SOFTWARE AGENTS TO PEER-TO-PEER SOFTWARE AGENTS

CROSS-REFERENCE TO RELATED APPLICATIONS

This application is a continuation-in-part of U.S. patent application Ser. No. 12/313,609 filed Nov. 21, 2008, now abandoned which claims priority from U.S. Provisional Patent Application 61/004,900 filed Nov. 29, 2007, both of which are incorporated herein by reference.

FIELD OF THE INVENTION

The invention relates generally to distributed software systems. More particularly, the invention relates to methods for providing transparent translation between client-server and peer-to-peer protocols.

BACKGROUND OF THE INVENTION

In distributed software systems, agents, also often called endpoints, devices, or user agents, communicate with each other and/or with central devices, such as servers. For example, an agent may both send and receive information, such as in a telephone-like device, or file/media sharing application. An agent may only receive (or request and receive) information, such as in a television-like device, a web client, or streaming media viewer agent. An agent may only transmit information, such as with a camera that is only able to stream information to a central server for others to obtain.

These agents may be realized in the form of a software application, a hardware device, or a hardware device running a software application which implements the agent. The agent may have a user associated with it, for example in the case of a phone or mail system where the agent processes messages for a particular user's number or address, or the agent may operate without an associated user.

Figure 4:
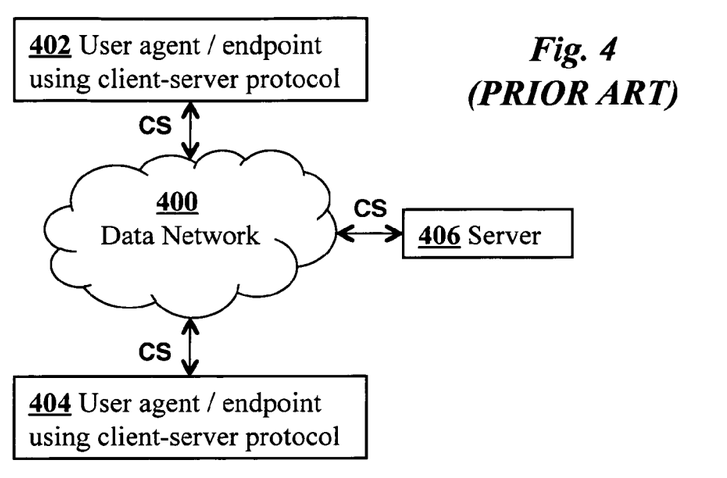
FIG. 4 is a schematic diagram illustrating a traditional client-server architecture in which agents communicate via a centralized server using a client-server protocol.

In traditional client-server (CS) architecture, such as the example shown in FIG. 4, agents 402 and 404 are connected to a centralized server 406, which acts on behalf of the agents, via network connections propagated through data network 400 using a client-server protocol. The behaviors or services that the central server 406 may provide to each agent include, for example, registration, or storing a mapping of a user's unique name to a network location of the agent associated with the user; presence information, or information about the user's availability, desire to be disturbed, etc.; locating a remote agent and proxying messages to that agent; locating a remote agent and referring or redirecting the agent to that party (often referred to as "discovery" or "rendezvous" capability); storage and/or distribution of information used by applications (such as web pages, media files, documents, etc.); storage and/or distribution of information such as configuration information; storage and/or distribution of information such as system warning or downtime information; storage and/or distribution of information related to system or software updates; storage of and/or distribution of messages in text, audio, video, or other form for later retrieval or delivery; providing security and asserted identity between various communicating parties; storing and delivering messages for a user who is unavailable; providing interactive voice response mechanisms; and providing information about resources stored by the remote agents and how to retrieve the information from the remote agents.

Peer-to-peer (P2P) mechanisms exist to distribute many of the services enumerated above. In a P2P communications system, one, more, or all of the functions that would normally be performed by a centralized server 406 are instead performed by a distributed group of the agents themselves, working together to collectively provide the service. For example, if user agents 402 and 404 were to use a P2P protocol instead of a CS protocol, then much of the functionality of server 406 would be provided by the P2P agents 402 and 404. In such cases, some aspects of communications between the agents might be identical to the behavior of an agent connecting to the central server. However, one or more critical aspects would differ in that the distributed group of agents performs a task that is, in the client-server protocol, performed by central server 406.

The following example illustrates how a client-server model may differ from a peer-to-peer model. In the Session Initiation Protocol (SIP), locating a remote party in a CS model involves several steps. At a high level, an agent 402 wishing to make themselves available for communications first registers, or sends a message or messages, to a central server 406, providing the location (IP address or other information required to route information) of the agent 402 and a well known name or address of record that refers to that agent's user. When a calling agent 404 wishes to send a message to the agent 402, it either sends requests to the central server 406 asking for the location of the remote agent 402 and then sends the message directly to the agent 402, or it sends the message to the server, which then routes or redirects the message so that it reaches the intended agent endpoint 402.

In a P2P model, registrations (the mappings between the user's well-known, unique name and current network location) are instead sent to one or more of the other agents that make up the distributed group of agents. These agents collectively maintain the mappings that would normally be maintained by the server. Using a P2P protocol to communicate over network connections, calling agents contact and work with one or more other agents (dependent upon the exact nature of the P2P algorithm) to locate the agent that is storing the registration. One or more intermediate agents or data provided by one or more agents, rather than a central server or information from a central server, is thus used to locate and communicate with the remote party's agent.

This P2P location mechanism (and, more generally, any other mechanism beyond location that is distributed among the end agents rather than being provided by a central server) requires special P2P functionality that is not normally present in CS agents. Implementations of a P2P system have to date taken three approaches: implementing a completely new agent containing P2P functionality, significantly modifying an existing agent to include P2P functionality, or using a separate, standalone "adaptor node" agent to receive the calling agent's CS protocol and make new P2P protocol calls on behalf of the calling agent.

Implementing a new P2P agent or modifying a CS agent to include P2P functionality both have a number of shortcomings. They require significant new engineering effort. They cannot immediately leverage all work on existing agents, since current agents require modification to operate. Finally, work done to modify one application client in no way improves the performance of other applications—each must be modified separately to perform the operations in a distributed fashion.

Figure 5:
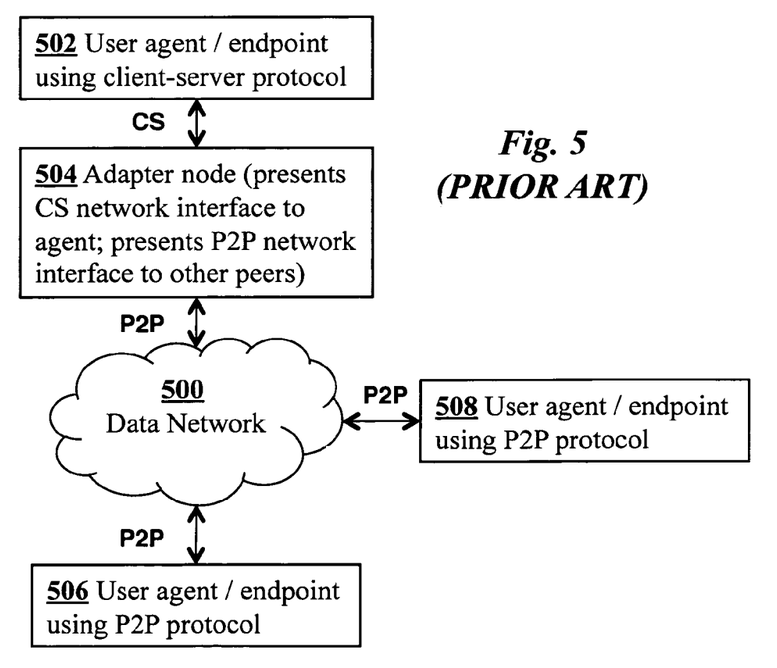
FIG. 5 is a schematic diagram illustrating a known network architecture using a standalone adaptor agent network device which translates between client-server protocol and peer-to-peer protocol.

Because of these shortcomings, a standalone adaptor agent, often called an adaptor node or adaptor peer, has been attempted, as illustrated in FIG. 5. Such an adaptor agent 504 runs as a member of a P2P network of agents which also includes P2P agents 506 and 508. These P2P agents communicate with each other over P2P network connections via a data network 500 using a P2P protocol. An unmodified CS agent 502 is explicitly configured to connect to the adaptor agent 504 over a network connection using a CS protocol. This network connection may be external (between two physical machines) or internal, using a virtual machine or loopback, but must always be explicitly configured in the unmodified CS agent 502. The adaptor node 504 acts as a central server in the view of the unmodified CS agent 502, but participates as a full P2P agent in the distributed group along with peers 506 and 508.

In some cases, the use of an adapter node works to allow unmodified CS agents to connect to a P2P network, but there are a significant number of problems with this approach, as well as cases where it fails. For example, problems arise with certain protocols that allow agents to initiate connections directly with other agents when the location of these have already been determined. In such cases, it may be difficult to ensure that the unmodified CS agent 502 does not become confused and try to communicate directly with P2P agents 506 or 508 rather than through the adapter agent 504. Failure to use the adaptor agent 504 for all communications can result in incorrect or corrupted P2P state information, or result in agents 506 and/or 508 receiving messages that they are unable to understand or process. A further problem is that most newer protocols, including the P2P protocols to which this concept applies, are designed with increased security. Since an older CS protocol is used between the unmodified agent 502 and the adaptor node 504, possibly traveling over an unsecured network or on a virtual network inside a multi-user machine, the advantages of the newer security mechanisms are not realized. Another problem is that if the adaptor agent 504 is located on a different host than the calling agent 502, the calling agent cannot function properly if the host running the adaptor agent 504 fails. In the event both 502 and 504 operate on the same host, the calling agent 502 will not operate in the event that the adaptor node application crashes. There may be no good mechanism for the adaptor agent to restart, or to even detect that the adaptor node has failed. Additionally, because the proper function of this system requires the calling agent 502 to be configured to communicate with the adaptor node 504, this mechanism is susceptible to misconfiguration.

Kruppa et al. in US Pat. Pub. 2009/0316687 discloses a P2P distributed call center method for high-level management of how to handle incoming calls to a call center. The technique is a layer on top of a communications system, and not a communications system itself. While standard P2P communications may be part of the underlying system, there is no teaching or suggestion by Kruppa of converting CS protocol to P2P protocol at the basic level of call control.

In view of the above, there is still a need for techniques that help overcome the existing challenges in converting client-server agents to peer-to-peer agents.

SUMMARY OF THE INVENTION

A mechanism is provided where a client is directly coupled in software to an adaptor software module that services underlying traffic from the unmodified agent and relays it on behalf of the agent. Rather than the agent using a network connection to the adaptor, all traffic generated by the agent is relayed directly to the adaptor software module.

In one aspect, a method of converting a client-server software agent to a peer-to-peer software agent is provided. A client agent, which operates using a client-server protocol, is directly coupled in software to an adaptor software module without any network connection between them. The adaptor software module receives from the client agent application-level network traffic in a client-server protocol, then it converts the received traffic into a peer-to-peer protocol and relays it over a network connection on behalf of the client agent. In one embodiment, the conversion between client-server protocol traffic and peer-to-peer protocol traffic is performed by a modified software library. In another embodiment, the conversion between client-server protocol traffic and peer-to-peer protocol traffic is performed by a modified stack performing deep packet inspection at the socket level.

In another aspect, a method for translating between client-server and peer-to-peer protocols is provided. The method includes receiving a network message conforming to a peer-to-peer protocol. If the network message is an application-level message and does not trigger an application-level event, a local protocol state is updated with information in the application-level message. If the network message is an application-level message and triggers an application-level event, a translated message is sent to an application layer in a client-server protocol to trigger an appropriate application-level event. Peer-to-peer protocol-level operations are performed in response to the network message. In addition, the method includes receiving from an application-layer a call conforming to a client-server protocol. If the call is a library initialization call, a local stack is created to handle subsequent calls and to process incoming network messages conforming to a peer-to-peer protocol. If the call is not a library initialization call but the call implies library initialization, a local stack is created to handle subsequent calls and to process incoming network messages conforming to a peer-to-peer protocol. If the call is a request to send information using a client-server protocol, then the request is translated to at least one network message conforming to a peer-to-peer protocol. The method may include various additional steps. For example, if the call received from the application layer is awaiting a response, a response network message in a peer-to-peer protocol is waited for. And if the response network message is received, a translated response in client-server protocol is sent to the application layer. The method may also include registering an appropriate event trigger if the call received from the application layer is not awaiting a response. If the response network message is later received, a translated response in client-server protocol is sent to the application layer.

The method may be implemented by a network edge device performing deep packet inspection, by software executing on a machine shared with application-level software generating the application-level message, or by an adapter software module that transparently translates client-server application level network messages to and from peer-to-peer network messages, e.g., a protocol stack, state machine, protocol library, dialog manager, or application driver. The adapter module converts a non-P2P protocol that the agent uses to a P2P protocol with exactly or substantially similar function signatures. Preferably, the client-server application requires little or no modification, since the function calls are essentially identical. Internally to the stack, however, these commands are translated to the P2P protocol. Activities such as lookup, storage of information, etc. are performed by the underlying stack in a P2P manner, with the result being passed back to the agent application in exactly the same format as if it were received from a server. In another aspect, the existing application may have inferior security properties, but the new stack will use superior security properties. In another aspect, a configuration mechanism may be provided to allow configuration of parameters that are specific to the P2P protocol and the adaptor software module. In a further aspect, the new stack may additionally provide some new functionality, allowing the client developer to add new features to the agent over time. Significantly, however, a client-server interface substantially like the existing interface is provided to allow agent applications to be converted to P2P enabled applications with little or no modification.

The above methods for converting between a client-server protocol and a P2P protocol may also be used to convert between two P2P protocols.

DETAILED DESCRIPTION

Although the following detailed description contains many specifics for the purposes of illustration, anyone of ordinary skill in the art will readily appreciate that many variations and alterations to the following exemplary details are within the scope of the invention. Accordingly, the following preferred embodiments of the invention are set forth without any loss of generality to, and without imposing limitations upon, the claimed invention.

In one embodiment of the invention a method is provided for converting a client-server software agent to a peer-to-peer software agent. FIG. 7 illustrates an example of a P2P system implementing one embodiment of the invention. A client agent 702, which is implemented as an application-layer software program, is originally designed to operate using a client-server protocol. The client agent 702 is directly coupled in software to an adaptor software module 704 without any network connection between them. In other words, instead of sending network messages down from the application layer, through the network protocol stack and passing them over a network connection to an adapter node in the network (see FIG. 6), the adapter module 704 is directly coupled to the client agent 702 so that the CS messages do not pass all the way down the network protocol stack and over a network connection. Instead, the CS messages from the agent 702 are intercepted by the adapter module 704 and converted to P2P protocol before they reach the link layer and pass over the network.

The conversion between client-server protocol traffic and peer-to-peer protocol traffic may be performed either by a modified software library or by a modified stack performing deep packet inspection at the socket level. In the case of a modified software library, the agent at the application layer is compiled against a modified library, which presents the same interface to the developer, but performs P2P operations in the background. Using deep packet inspection, on the other hand, the translation between CS and P2P may take place either by intercepting messages at a very low level (socket or data connection level) or by translating messages at a higher level (stack, state machine, application). In any case, the agent requires no separate adaptor device for the conversion, as it is directly coupled at a software level to the adaptor software module that performs the P2P translation operations.

The adaptor software module 704 receives from the client agent 702 application-layer network traffic in a client-server protocol and converts the received traffic into a peer-to-peer protocol. Only after the CS traffic is converted to P2P protocol is the traffic relayed on behalf of the client agent 702 over a network connection. Consequently, unmodified (or minimally modified) application layer agent 702 designed to operate using CS protocol is enabled by adaptor module 704 to communicate with P2P agents 706 and 708 over network 700 using a P2P protocol. The P2P functionality is transparent to the application layer agent 702 which still operates as if it were using a CS protocol.

Figure 6:
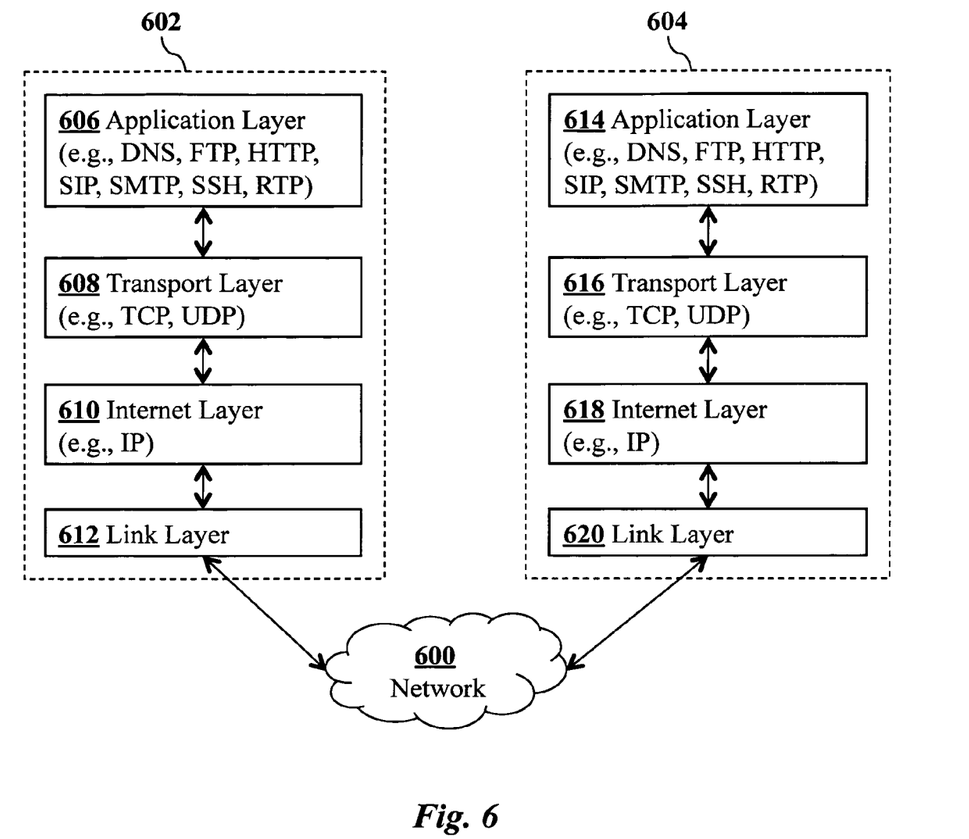
FIG. 6 is a schematic diagram that illustrates network protocol stacks in two devices connected to each other via a network connection, according to an embodiment of the invention.
Figure 7:
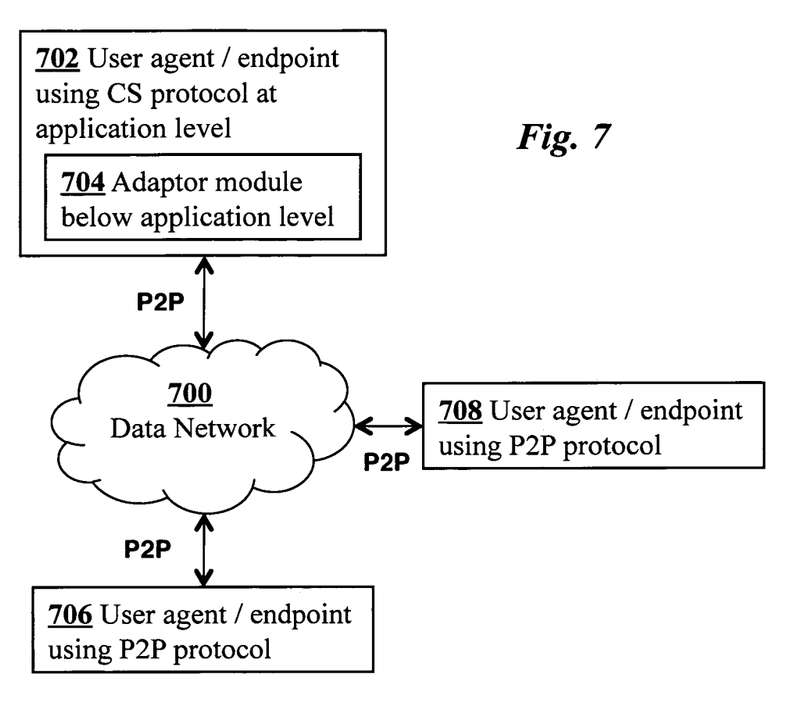
FIG. 7 is a schematic diagram that illustrates an example of a P2P architecture for converting a client-server software agent to a peer-to-peer, software agent, according to an embodiment of the invention.

FIG. 6 illustrates the network protocol stacks in two devices 602 and 604 connected to each other via a network connection. Each device has a network protocol stack composed of several layers. The network stack for device 602 has application layer 606, transport layer 608, internet layer 610, and link layer 612. Similarly, the network stack for device 604 has application layer 614, transport layer 616, internet layer 618, and link layer 620. In one embodiment of the present invention, the CS traffic generated by an agent at application layer 606 in device 602 is converted to P2P protocol prior to passing down the lower layers of the network stack (e.g., layers 608, 610 and 612) and over a network connection through network 600.

In contrast, prior techniques using adapter nodes (see. FIG. 5) function by passing the CS traffic from application layer 606 down through all layers 608, 610, 612 of the network protocol stack and over network 600. The CS traffic is then received by the adapter node 604, passes up the protocol stack, is converted from CS to P2P, and only then does P2P traffic pass down the protocol stack of the adapter node device 604 and out on the network 600.

Thus, the present embodiment of the invention is distinguished by the fact that CS traffic does not flow down all layers of the protocol stack of any device. Those skilled in the art will appreciate that this technique may be implemented in various ways including a modified protocol stack, state machine, protocol library, dialog manager, or application driver.

Embodiments of the present invention can be used to convert between various different CS and P2P protocols, enabling translation between them that is transparent to the application layer agent(s). Various general principles, however, apply to all these implementations. In a structured P2P system, systems are uniquely identified, and are located based upon P2P identifier (ID) (such as a peer or node ID), which are either used in place of, or in addition to, traditional network routing primitives such as IP addresses, Ethernet addresses, etc. The adaptor module 704 works by receiving calls from the application to a modified software entity, such as a protocol stack, state machine, protocol library, dialog manager or application driver. This modified software entity is designed to appear to the application as a traditional CS version. Once CS calls from the application are received, the underlying adaptor module code is responsible for making a number of modifications/translations to the message (if passed as a complete message) or to encode it in a different way than the unmodified library would have. In both cases, this is done before any information is sent over a network connection or to a low-level socket library. These modifications may include one or more of the following. (Note that these modifications are quite different than those that would be applied when translating between two different CS protocols.)

An exemplary translation may be applied to messages that are being sent out in a P2P or overlay network, and in many cases these require a P2P identifier. For the first message being sent, an identifier is obtained, either by local generation (for example hashing a unique property), protocol based mechanisms to request an ID from the other peers, or out of band mechanism for requesting an ID. This ID may or may not also provide cryptographic assertion of identity.

Another translation example may include a case where all messages that are sent after an ID is obtained (including the first message sent) may need to include this ID. The modified protocol stack, state machine, protocol library, dialog manager, or application driver inserts this ID into the messages. Received messages may need to have this ID (and other information added to support insertion of this ID) stripped or translated before being passed back to the unmodified application. Additionally, the messages may need to be made to appear to have originated from the desired target of the CS protocol.

A further translation example can be applied in cases where message routing in structured P2P systems often involves performing a lookup, and using the returned network location as the destination of the message. As such, the modified protocol stack, state machine, protocol library, dialog manager, or application driver performs this lookup, and if required by the particular P2P protocol being used, places this information into headers to route the message, rather than the more traditional mechanisms that may be used in a CS protocol, such as DNS resolution or sending directly to an embedded IP address. The information added to support this may need to be stripped or translated from received messages before they are passed back to the unmodified application. Additionally, the messages may need to be made to appear to have originated from the desired target of the CS protocol.

In another translation example, messages routed in a structured P2P network also may need to be sent through an intermediary device, determined by the underlying P2P network. This could be for topological routing considerations, NAT traversal, obfuscation/anonymity of the messages, or simply because the particular P2P protocol used requires such an intermediary be used. As such, the modified protocol stack, state machine, protocol library, dialog manager, or application driver will determine which other peer it is appropriate to use to relay the message, marking and routing the request appropriately as needed. Information added to support this may need to be stripped or translated from received messages before being passed back to the unmodified application. Additionally, the messages may need to be made to appear to have originated from the desired target of the CS protocol.

In a further translation example, some P2P protocols may require unique signatures or encryption properties, for example ones that sign or encrypt information as being from a particular peer. This may involve fetching of the appropriate information (certificates or other information) that is needed to encrypt or decrypt messages from other peers, so they can be translated and passed back to the unmodified application.

Additionally, messages of different types may be treated differently in different protocols. For example, in some CS telephony applications, messages providing location, controlling features, storing voicemails, and setting up calls, may all be sent to different devices, e.g., registration servers, feature servers, voicemail servers, and call control servers. In a P2P system, all of these features may be distributed among the peers, and require appropriate lookup to route to a peer with those capabilities. Similarly, a CS system may require all messages to be sent to one location, and again a P2P system may distribute the functions among the peers, requiring lookup of locations before transmitting, or storing information.

In an unstructured P2P system, IDs may not be present, but techniques such as broadcasts or flooding the network may be used to locate an appropriate host for messages to be sent to, and appropriate routing information based on these P2P responses may be inserted on outbound messages and stripped from inbound messages. The modified protocol stack, state machine, protocol library, dialog manager, or application driver may then route messages to the appropriate peer, based on these unstructured searches. Information added to support this may need to be stripped or translated from received messages before they are passed back to the unmodified application, just as ID based information would need to be stripped or translated in the case of a structured P2P system. Additionally, the messages may be made to appear to have originated from the desired target of the CS protocol.

These types of translations described above are fundamentally different from the type of translations that are offered by traditional CS to CS translations. Such CS to CS translations often involve little more than converting an address or transcoding packets from one protocol to another.

In one aspect, if there are several agent applications, each of which uses a different stack implementation, modifying a single stack implementation may not allow all the agents to transparently use the new protocol. Consequently, deep packet inspection techniques may be used instead. In such a case, the client application layer program is built against a modified low-level data connection library (for example a socket library or equivalent), rather than the traditional system low-level data connection library. Unlike an adaptor node, the raw messages are not passed over a network or within the computer as virtual messages across the loop back or system sockets, but are rather intercepted by a modified interface library. This library performs deep packet inspection, examining each packet to see if it is using the older, CS protocol. As appropriate, packets that are not using a CS protocol selected for translation to P2P are passed unmodified to the network connection, while packets using such a CS protocol are processed and modified. As a result of the processing of the packets, P2P packets are inserted on the network connection as appropriate. The modified low-level data connection is used to pass packets back to the calling application level program such that the packets appear to have come from the network and to have been processed in a client-server fashion.

In some cases there may not be a one-to-one mapping between the old packets and new packets. As such, the modified low-level data connection library may send and receive messages over a network connection at a different rate or with different payloads than those passed back and forth between the modified data connection library. This allows for translation even in cases where the new P2P protocol differs radically from the client-server protocol.

Implementing such an application using deep packet inspection is similar to the other embodiments discussed above. The primary difference is where the protocol translation code is implemented. In the other embodiments above, this code lies in the modified protocol stack, state machine, protocol library, dialog manager, or application driver, which has a signature similar to the unmodified one, and in general is an application level software implementation. In a deep packet inspection implementation, the application level protocol stack, state machine, protocol library, dialog manager, or application driver is left intact, but the messages it produces are intercepted at a low level using deep packet inspection before being passed over a network connection. These intercepted messages are then translated from CS to P2P using techniques discussed above in relation to other embodiments. The application layer program is unchanged, and is even linked to an unmodified protocol library.

Deep packet inspection has been used previously in other contexts to intercept and redirect messages to a different (but usually fixed) location, to translate messages between two CS protocols, or to translate internal addresses to traverse a NAT. In general, run time decisions about where messages are routed are not made in these prior applications of deep packet inspection. In this case, however, the unique properties of a P2P network (including as discussed above, choosing where to route messages, marking them appropriately for an overlay, performing broadcasts, etc.) make the type of translation performed quite different. Packets that are not related to a selected CS protocol to be translated to P2P or that are unrelated to the new P2P protocol are untouched.

In contrast with techniques in which an agent is connected over a network connection to an adaptor agent (FIG. 5), in the embodiments described above, there is a single resulting software entity and CS messages selected for translation to P2P are not passed over a network connection (either physical or virtual internal such as a loopback or system socket). No traffic in the selected CS protocol is transmitted over the network, ensuring that messages are not inadvertently sent in a non-P2P fashion, and ensuring old security mechanisms, if applicable, are not accidentally used.

In embodiments of the invention, the agent is not explicitly aware of any network connection to an adaptor module and need not be configured for such a connection. In the adaptor node scenario, on the other hand, the agent must be explicitly configured to communicate with the adaptor, just as if the adaptor were a server. The adaptor node approach is thus not entirely transparent or configuration-free.

In the approach of these embodiments, the code is recompiled against the adaptor software module, or is performed at the socket library level, which makes the protocol translation transparent to the higher-level agent. Additionally, this mechanism does not require packets to pass over a virtual network connection (although, as noted below, an alternate embodiment where this does occur is mentioned).

Embodiments of the invention may be implemented such that the low-level code performing the translation could additionally switch back and forth in behavior between translating a selected CS protocol or not, thus producing a P2P application or not translating the underlying packets, allowing the application to operate alternatively in either P2P or CS modes, without modification to the application.

According to another embodiment, the deep packet code is implemented in a NAT device, firewall, router, gateway or any other device that sits in the network, in particular, at the interface, or edge, between a local network and a wider area network such as the internet so that it intercepts packets flowing to and from the WAN. All intercepted traffic is inspected for client-server traffic, which is then transparently converted to P2P traffic. Although similar in architecture to the system of FIG. 5, the use of deep packet inspection avoids the need to configure the endpoint agents on the local network to communicate with an adaptor node. Instead, this embodiment allows insertion and configuration of the edge box implementing the deep packet inspection, allowing all CS agents behind the network to be switched transparently over to a P2P protocol as seen by the WAN, without the agents even being aware this change had happened. This provides the opportunity for providers/managers to transition enterprises or organizations from CS to P2P in a nearly seamless way. This technique could be implemented as deep packet inspection, as discussed in the earlier embodiment above, but with the CS traffic now flowing over a LAN unmodified until it reaches the network edge, where the translation between protocols takes place. Similar techniques have been implemented in other contexts to fix addresses within a protocol while traversing NATs and to translate from one protocol to another. However, the unique nature of the changes required to convert between P2P and CS, as outlined in above, make this a unique application of deep packet inspection technology.

This transparent deep packet inspection behavior could also be placed in operating system software, such as a system-wide firewall. In such a case, all applications running on the host would be converted, again without modification to or configuration of the applications implementing the CS agents.

Similarly, the behavior could be implemented directly in the OS low-level data connection library itself, meaning all applications using the network connection would be translated.

Packet inspection and modification behavior is often implemented in firewalls, NATs, or Session Border Controllers (SBCs). However, such behavior has not been used previously to convert between different protocols or between P2P and non-P2P protocols.

Note that this mechanism can additionally be used to translate between CS and P2P versions of the same protocol, where appropriate, or even to translate messages from multiple CS protocols into a single P2P protocol.

Thus, an adaptor module may be transparently inserted into an edge device in the network or within an OS network component (low level data interface, firewall, etc.). Such an adaptor module uses deep packet inspection to intercept and translate messages from the agents before they are fed onto the WAN. This adaptor module thus differs from the existing adaptor node approach in that such interception and modification of traffic is transparent to the agent and does not require the agent to be "pointed" at an adaptor that serves on the behalf of the agent. This adaptor module also allows installations to be translated from one protocol to another in place.

The edge agent resident approach described above differs from the session border controllers (SBCs) deployed today in that the inspection mechanism is used to fundamentally alter the behavior of the agents from speaking a client-server oriented protocol to speaking to one that is peer-to-peer. To date, SBCs have been used mostly to enforce security, to modify the IP addresses embedded in messages to allow the traffic to traverse NATs, or to translate between one CS protocol and another. Today, these devices mostly translate between two versions (often proprietary) of a single CS protocol, or between two different CS protocols. Additionally, they are used to modify protocols to pass NATs, insert additional security, etc. They are not used to translate between CS and P2P protocols, or between CS and P2P versions of one protocol.

A functional description of the operation of some embodiments of the invention will now be described in relation to FIGS. 1-3. These embodiments illustrate the functioning of an unmodified CS application layer program that issues calls to and receives messages from a modified underlying protocol stack, state machine, protocol library, dialog manager, or application driver (all of which are collectively referred to below as a "library"). This modified library is designed so that the application layer programs interacting with it see it behaving exactly as an unmodified library that uses an original protocol(s), including identical calls and responses. The library then translates the messages in the original protocol(s) to and from P2P protocol(s).

The library processes both new incoming messages that arrive at the library from a network connection and various software commands (calls) issued by the application to the library. As translation between different protocols and different specific software embodiments (different libraries, protocol stacks etc.) may cause slightly different actions, for other types of actions not described here, the overriding functionality of the library is to perform operations (storing local data, sending messages, responding to calls from the application, etc.) as required such that the library appears to devices connected over the network as a software entity communicating using the new protocol(s) while appearing to the application as an unmodified library for the earlier protocol(s).

Figure 1:
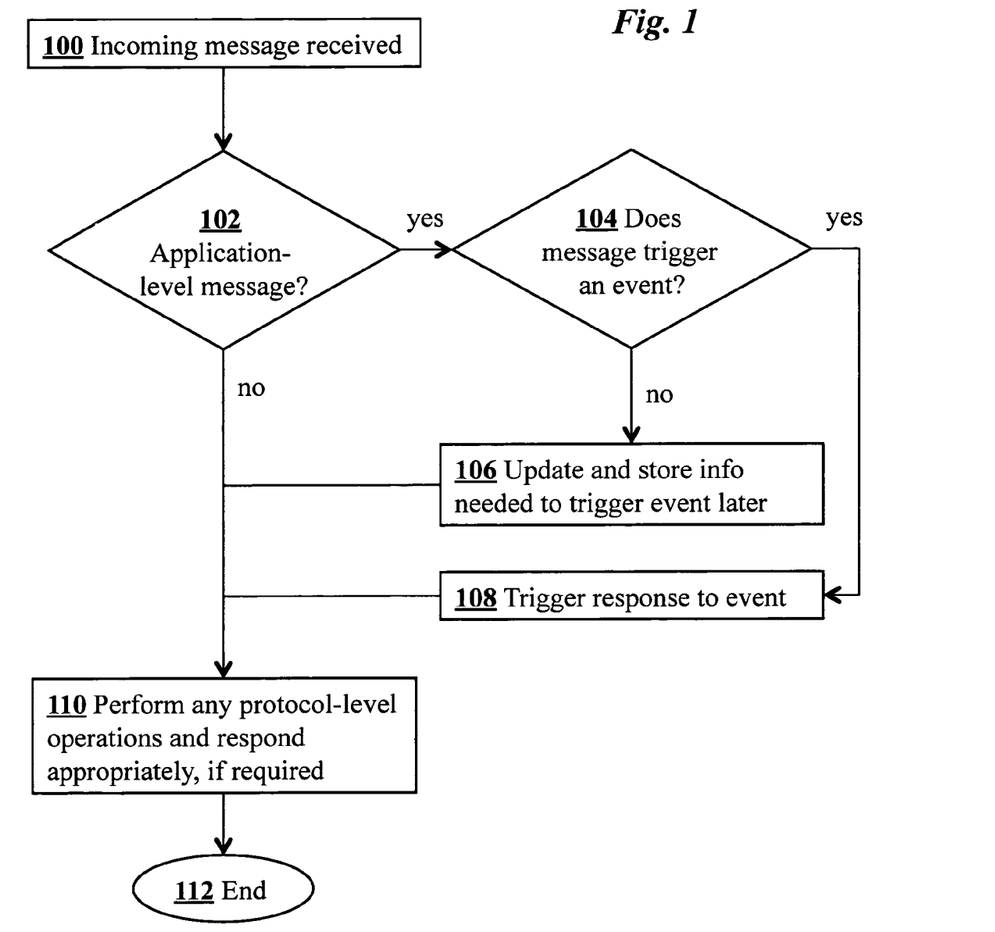
FIG. 1 is a flowchart illustrating a method implemented in a software library when an incoming message from the network is received, according to an embodiment of the invention.

When an incoming message from the network is received by the library, the following steps are performed by the library, as illustrated in FIG. 1. Note that standard lower-level operations (such as message reassembly in the event of fragmentation, encryption and decryption of messages, performing checksums, etc.) may occur as part of the protocols used, but are not illustrated here for clarity in understanding the invention.

In step 100 the library receives the incoming message over a network connection. In step 102 the message is examined to determine if the purpose of the message is to send a message to the local application, or simply a message used by the new protocol(s). For example, a message used by the new protocol might be a message containing information to traverse NATs, to keep connections alive, or to maintain the P2P structure (overlay) such as to replication information or maintain connections between peers. If the message is not simply for protocol(s) maintenance (i.e., if it is an application level message), control is passed to step 104 which examines the message to determine if it contains information that causes an event to be triggered that must be passed to the application. If the message is not simply for protocol(s) maintenance (is an application level message), but does not contain information that causes an event to be triggered, in step 106 the library updates local state with the information received in the event it may be needed later when an event is triggered. Note that this handles the case where there is not a one-to-one correspondence between messages in the new protocol(s) and the original protocol(s). Control is then passed to step 110. If in step 104 it is determined that the message is not simply for protocol(s) maintenance (is an application level message), and does cause one of the events to be triggered, in step 108 the library looks up the corresponding event to determine what action (e.g., calling a function) is to be taken. In addition, the library properly formats the data received in a way that the unmodified application is familiar with, and performs any actions to be triggered when the event occurs. Control is then passed to step 110, in which any required low-level protocol operations for the new protocol(s) are performed (e.g., updating lists of peers, marking connections as live, or storing data required in a P2P layer), and any required responses to the message are constructed and transmitted. The processing of an incoming message is then completed in step 112.

For calls made by the application into the P2P library there are a number of different types of requests that may be made. In all cases, The application issues a call to the library. The value(s) provided to the library (if any) by the unmodified application (values passed, name of the call, etc) are functionally identical to an unmodified library call, and the value(s) returned (if any) appear to have come from the unmodified library.

Figure 2:
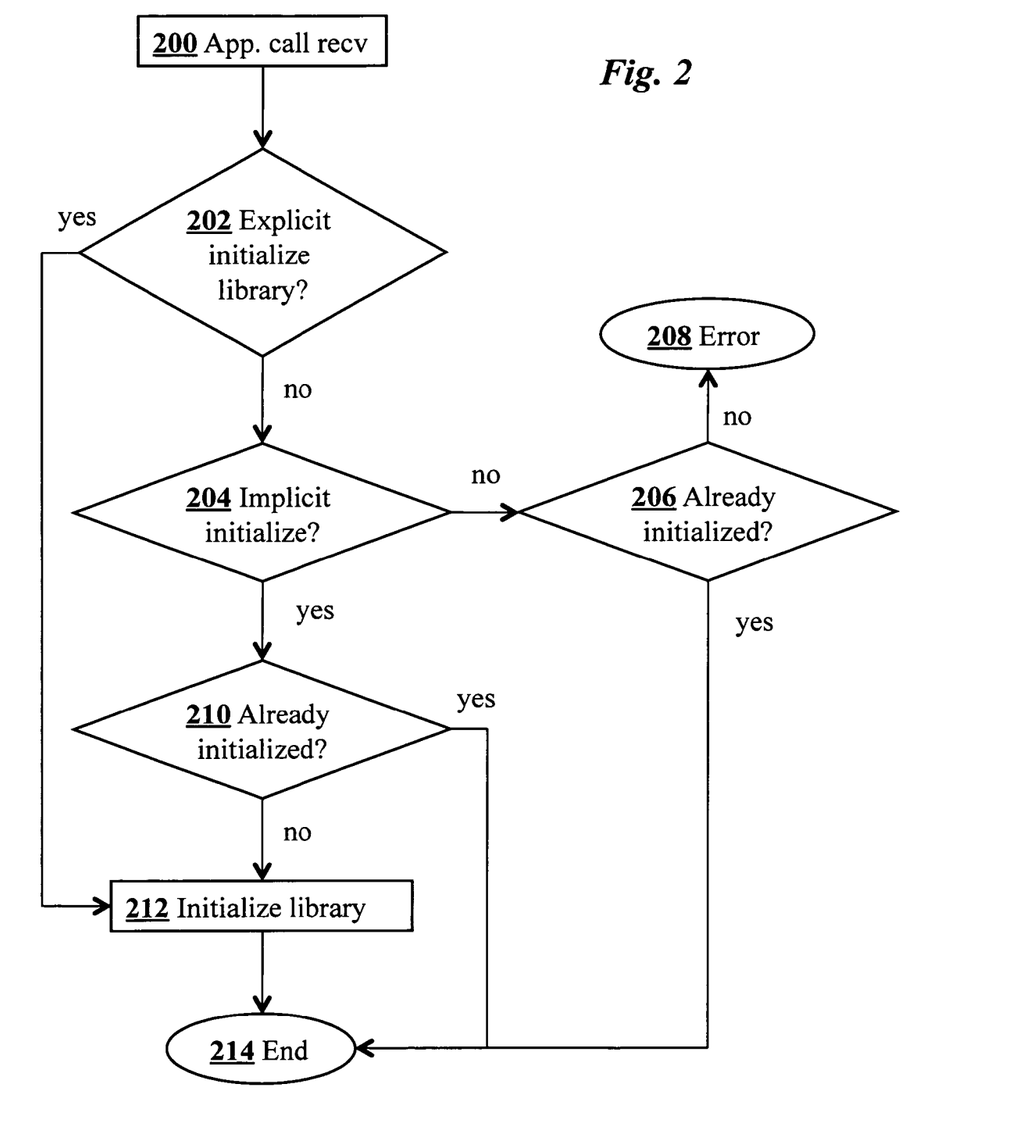
FIG. 2 is a flowchart illustrating a method for processing requests that initialize the software library, according to an embodiment of the invention.

Requests that initialize the library are processed as shown in FIG. 2. Note that this behavior may be spread across multiple calls. In step 200 the library receives a call from the application layer (e.g., a function call, method on an object, or OS call). In step 202 the call is examined to determine if this is an explicit library initialization call (note that this examination may be implicit, for example, in that the call is or is not a particular initialize function). If the call is an initialization call, control is transferred to step 212 in which the library is initialized. Specifically, actions are performed to create the local stack needed to handle further calls and to process incoming message. This may include creating data structures, opening sockets, and so on. The handling is then completed in step 214. If in step 202 it is determined that the call is not an explicit initialization call, control is transferred to step 204 which checks to see if the library supports implicit initialization when the first command arrives and if this is a message that causes implicit initialization. If not, control is transferred to step 206 which checks if the library is already initialized. If not, an error condition is present and control is passed to step 208. If so, the initialization phase is over and control is transferred to step 214 which terminates the processing. If, in step 204, the library supports implicit initialization when the first command arrives and if this is a message that causes implicit initialization, then control is transferred to step 210 which checks if the library is already initialized. If not, then the library is initialized in step 212 as discussed above. Otherwise, control is transferred to step 214 and the initialization phase is over.

Requests that create local data structures, register functions to be called back when incoming messages are received, and so on, behave as discussed as follows. For calls that create local data structures, the library will create and maintain this information for a duration similarly to the unmodified application (until program end, until the structures are explicitly de-allocated, until no longer needed, and so on). The policy for determining if the resources can be deleted is the same as for the unmodified library. For calls registering callbacks to be called on the receipt of messages, the library creates and maintains a list of events that are registered and the action to be taken in response to this event. Note that this may be a complex structure, as the event being registered for in the old protocol(s) may not have a one-to-one correlation to events in the new protocol(s) library's case. The library will maintain a decision tree, table, event tracker, or the like to determine when the corresponding event from the original protocol(s) would have occurred. The library returns an appropriate return value, corresponding to the value that would have been returned by the unmodified library, ensuring that application requires no modification.

Figure 3:
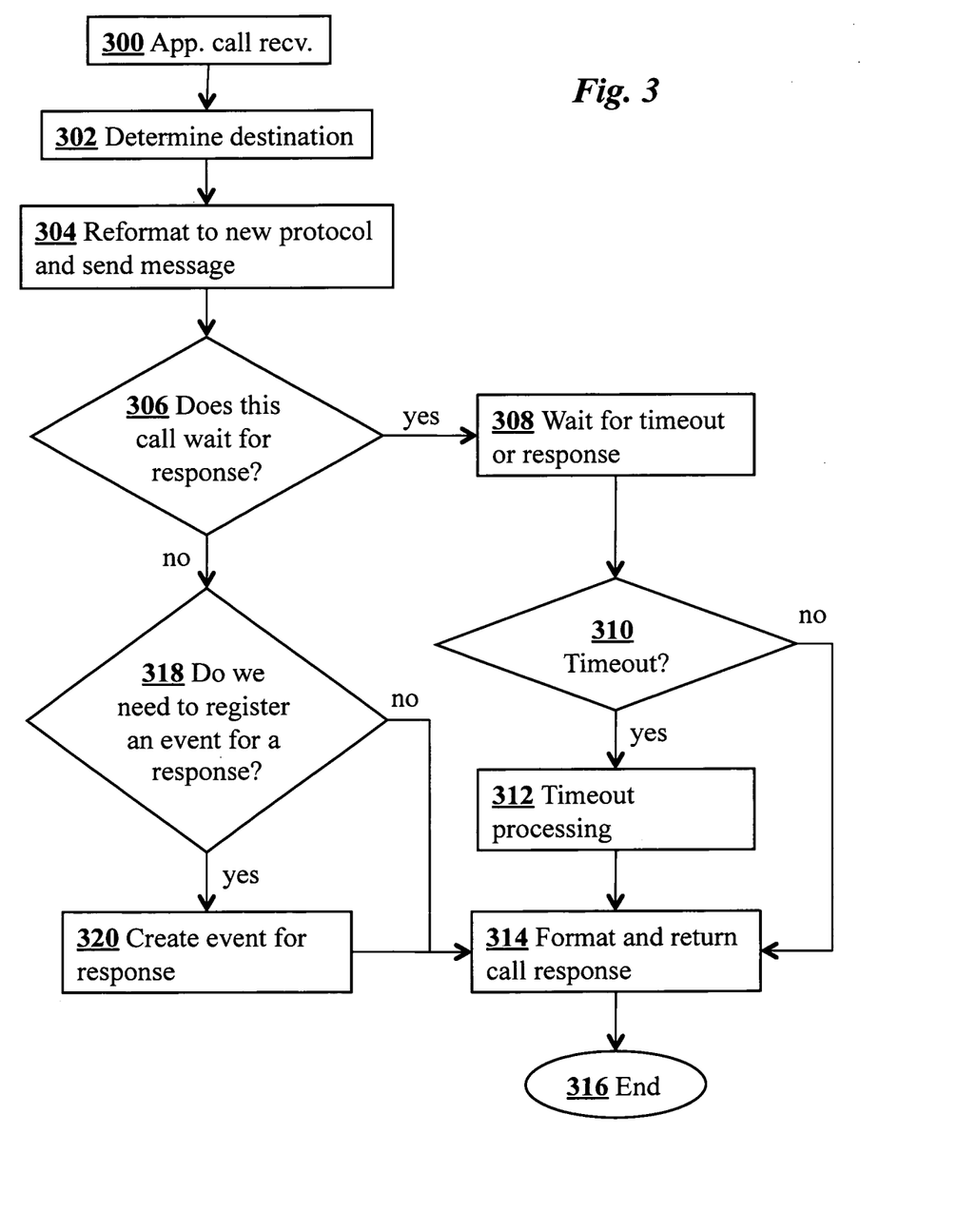
FIG. 3 is a flowchart illustrating a method for processing requests from the application layer to send information out using the original protocol(s), according to an embodiment of the invention.

Requests from the application layer to send information out (with or without a response) using the original protocol(s) (e.g., requests to store information or to request information)

are handled as illustrated in FIG. 3. In step 300 the library receives a call from the application (e.g., a function call, method on an object, or OS call). In step 302 the library examines the call and uses configuration information and information about the new protocol(s) to determine where the message should be sent. For example, the destination may be the destination peer for a P2P protocol. Note that this process may itself involve sending a number of messages. In step 304 the library takes the information provided in the call and properly formats it for the format of the new protocol(s), and sends the message to the destination calculated in step 302. Note that, in some P2P systems, the determination of where the message is sent is implicit (i.e., the message is sent to a "best guess" peer, which sends to its "best guess", and so on). In some embodiments, steps 300, 302, 304 may be combined. In step 306 the library determines if the call received from the application is a blocking call, i.e., one that waits for a response (e.g., an acknowledgement that that the message had been received or data returned in response to a request). If it is a blocking call, step 308 waits for a response from peer(s) that the request was sent to, or for a timeout (indicating the message failed) to be returned. Step 310 checks if the message times out. If so, appropriate timeout processing is performed in step 312. If no timeout was received (i.e., a response is received), control passes to step 314 which formats a response to the call. The response is formatted so that it appears to be identical to the response (if any) that would have occurred in the unmodified library. The response (if any) is returned in step 314, and the processing is completed in step 316. If in step 306 the call is not blocking, control is passed to step 318 which determines if a new event must be registered to trigger an action when a response is received later. If so, step 320 sets up an appropriate event registration and passes control to step 314. If not, control is passed directly to step 314 which formats the response (if any) in a form that is appropriate for the original, unmodified library and returns it to the application. The process then completes at step 316.

In summary, according to embodiments of the invention, a protocol stack, state machine, protocol library, dialog manager, or application driver is provided for the new P2P protocol with exactly or substantially similar function signatures to the older, non-P2P protocol the CS agent is built using. The application requires little or no modification, since the function calls are essentially identical. Internally to the stack, however, these commands are translated to the new protocol, and activities such as lookup and storage of information are performed by the underlying stack in a P2P manner, with the result being passed back to the calling agent application in exactly the same format as if it were received from a server. The existing application may have inferior security properties, but the new stack will preferably use the newer, superior security properties. The existing application may function only in CS mode, or in combination with the adaptor software module, it can join the P2P network. The new stack or software may provide a configuration mechanism to allow configuration of parameters that are specific to the new protocol and the adaptor software module. The new stack may additionally provide some new functionality, allowing the client developer to add new features to the agent over time, but an interface substantially like the existing one is provided to allow agent applications to be ported with little or no modification. If an application is operating in a CS mode, the traffic can be monitored to detect a loss in connectivity with the server. In such an event, the translation to P2P protocol can be automatically turned on, providing switching between protocols that is transparent to the application.

Those skilled in the art will appreciate that the techniques of the present invention may be used for translating not only between CS and P2P protocols but also between different P2P protocols such as structured/DHTs, unstructured/flooding, tracker-based, and so on. It will also be evident to those skilled in the art that, while the invention has been described for the sake of simplicity as translating one protocol to another, it may be easily extended to translate between multiple protocols, e.g., translating several different CS protocols to and from several different corresponding P2P protocols.

The present invention has now been described in accordance with several exemplary embodiments, which are intended to be illustrative in all aspects, rather than restrictive. These embodiments are capable of many variations in detailed implementation, which may be derived from the description contained herein by a person of ordinary skill in the art. All such variations are considered to be within the scope and spirit of the present invention as defined by the following claims and their legal equivalents.

The invention claimed is:

1. A method implemented by a client agent device for translating between client-server and peer-to-peer protocols, the method comprising:

executing by the client agent device application-level software that sends and receives client-server protocol messages;

executing by the client agent device an adapter software module that transparently translates the client-server protocol messages to and from peer-to-peer protocol messages;

wherein the adapter software module and the application-level software are directly coupled to each other in software on the client agent device;

receiving by the adapter software module on the client agent device a network message conforming to a peer-to-peer protocol;

if the network message is an application-level message and does not trigger an application-level event, updating by the adapter software module on the client agent device a local protocol state with information in the application-level message;

if the network message is an application-level message and triggers an application-level event, sending by the adapter software module on the client agent device to an application layer on the client agent device a translated message in a client-server protocol to trigger an appropriate application-level event for the application-level software;

performing by the adapter software module on the client agent device peer-to-peer protocol-level operations in response to the network message;

receiving by the adapter software module on the client agent device a call from the application layer on the client agent device, wherein the call is generated by the application-level software and conforms to a client-server protocol;

if the call generated by the application-level software is a library initialization call, creating by the adapter software module on the client agent device a local stack to handle subsequent calls and to process incoming network messages conforming to a peer-to-peer protocol; if the call generated by the application-level software is not a library initialization call but the call generated by the application-level software implies library initialization, creating by the adapter software module on the client agent device a local stack to handle subsequent calls and to process incoming network messages conforming to a peer-to-peer protocol;

and if the call generated by the application-level software is a request to send information using a client-server protocol, then translating by the adapter software module on the client agent device the request to at least one network message conforming to a peer-to-peer protocol.

2. The method of claim 1 further comprising:

if the call generated by the application-level software is awaiting a response, waiting for a response network message in a peer-to-peer protocol;

if the response network message is received, sending the application-level software a translated response in client-server protocol.

3. The method of claim 1 further comprising:

if the call received from the application-level software is awaiting a response, waiting for a response network message in a peer-to-peer protocol;

if the response network message is later received, sending the application-level software an event trigger in the client-server protocol.

4. The method of claim 1 further comprising:

if the call received from the application-level software is not awaiting a response, registering an appropriate event trigger;

if the response network message is later received, sending the application-level software a translated response in client-server protocol.

5. The method of claim 1 further comprising:

if the call received from the application-level software is not awaiting a response, registering an appropriate event trigger;

if the response network message is later received, sending the application-level software an event trigger in client-server protocol.

6. The method of claim 1 wherein the adapter software module is software selected from the group consisting of a protocol stack, state machine, protocol library, dialog manager, application driver, software firewall, modified socket library, and system service.

* * * * *